US009608718B2

United States Patent
Monsen et al.

(10) Patent No.: US 9,608,718 B2
(45) Date of Patent: Mar. 28, 2017

(54) METHOD AND APPARATUS FOR DEMODULATION OF A DESIRED SIGNAL BY CONSTELLATION-INDEPENDENT CANCELLATION OF NONLINEAR-DISTORTED INTERFERENCE

(71) Applicants: PM Associates, Stowe, VT (US); Datum Systems Inc., San Jose, CA (US)

(72) Inventors: Peter Monsen, Stowe, VT (US); Richard Hollingsworth Cannon, Mesa, AZ (US)

( * ) Notice: Subject to any disclaimer, the term of this patent is extended or adjusted under 35 U.S.C. 154(b) by 0 days.

(21) Appl. No.: 15/166,879

(22) Filed: May 27, 2016

(65) Prior Publication Data
US 2016/0359552 A1 Dec. 8, 2016

Related U.S. Application Data

(60) Provisional application No. 62/170,391, filed on Jun. 3, 2015.

(51) Int. Cl.
| | |
|---|---|
| *H04B 1/18* | (2006.01) |
| *H04B 1/10* | (2006.01) |
| *H04B 7/185* | (2006.01) |
| *H04B 7/06* | (2006.01) |
| *H04J 11/00* | (2006.01) |
| *H04J 3/16* | (2006.01) |
| *H04B 1/7093* | (2011.01) |

(52) U.S. Cl.
CPC ....... *H04B 7/18528* (2013.01); *H04B 1/7093* (2013.01); *H04B 7/0639* (2013.01); *H04J 3/1694* (2013.01); *H04J 11/0023* (2013.01)

(58) Field of Classification Search
CPC H04B 7/18528; H04B 7/0639; H04B 1/7093; H04J 11/0023
USPC .............. 455/131, 295, 306, 309, 337, 339
See application file for complete search history.

(56) References Cited

U.S. PATENT DOCUMENTS

| | | | | | |
|---|---|---|---|---|---|
| 5,659,573 | A | * | 8/1997 | Bruckert | H04B 1/707 375/142 |
| 6,865,174 | B1 | * | 3/2005 | Tsubouchi | H04B 1/707 370/335 |
| 8,068,827 | B2 | * | 11/2011 | Miller | H04B 7/18528 455/12.1 |
| 8,294,605 | B1 | * | 10/2012 | Pagnanelli | H03M 3/358 341/144 |
| 2002/0039887 | A1 | * | 4/2002 | Delabbaye | H04L 27/0012 455/42 |
| 2003/0099309 | A1 | * | 5/2003 | Fimoff | H04L 25/0228 375/340 |

(Continued)

*Primary Examiner* — Dominic Rego
(74) *Attorney, Agent, or Firm* — Mintz Levin Cohn Ferris Glovsky and Popeo, P.C.; Steven M. Jensen; Richard B. Emmons

(57) ABSTRACT

A method and apparatus are provided for demodulating a received signal containing modulated desired-signal digital data and relayed-interference that results from a nonlinear-distorted interference signal. Estimation of the nonlinear-distorted interference from a pre-distortion interference signal and subsequent cancellation within the received signal of the distorted interference produces a residual-interference signal that is subsequently demodulated to produce estimates of the desired-signal data. The estimation is adapted for changing nonlinear distortion effects.

12 Claims, 7 Drawing Sheets

(56) References Cited

U.S. PATENT DOCUMENTS

| | | | |
|---|---|---|---|
| 2004/0101034 A1* | 5/2004 | Ben-David | H04L 25/067 375/148 |
| 2006/0067438 A1* | 3/2006 | Menkhoff | H04L 7/0337 375/343 |
| 2007/0153884 A1* | 7/2007 | Balasubramanian | H03F 1/3247 375/221 |
| 2011/0065381 A1* | 3/2011 | Hausman | H04B 7/18513 455/12.1 |
| 2012/0161864 A1* | 6/2012 | Lee | H03F 3/217 330/10 |
| 2014/0126675 A1* | 5/2014 | Monsen | H04L 25/03012 375/350 |
| 2014/0195577 A1* | 7/2014 | Nikitin | H03H 7/0153 708/304 |

* cited by examiner

METHOD AND APPARATUS FOR DEMODULATION OF A DESIRED SIGNAL BY CONSTELLATION-INDEPENDENT CANCELLATION OF NONLINEAR-DISTORTED INTERFERENCE

RELATED APPLICATIONS

This application claims the benefit of priority under 35 U.S.C. §119(e) to U.S. Provisional Application No. 62/170,391, filed Jun. 3, 2015, which is incorporated herein by reference in its entirety.

BACKGROUND (a) Technical Field

The present invention relates to digital data modulation systems that include nonlinear-distorted interference cancellation and subsequent demodulation of a cancelled signal.

(b) Description of the Related Art

It is known to provide cancellation/demodulation systems that include successive interference cancellation (SIC) receivers and satellite systems that employ channel reuse in the satellite downlink. In multiuser applications, for example, a SIC receiver can be used to cancel nonlinear-distorted interference, that is associated with a previously-demodulated stronger user, in order to demodulate the next weaker user.

In a satellite-transponder communication system a local terminal communicates with a remote terminal over a duplex satellite communications link in which a loop-back transponder sends a transmitted signal to both the terminal receivers. The transponder is designated loop-back, or alternatively "bent-pipe", as its operation is limited to bandpass filtering, frequency translation and amplification and does not include demodulation and remodulation. Thus, the downlink to the local terminal contains a relayed-interference signal corresponding to the transmitted signal designated for the remote terminal. Conventionally, to avoid this relayed interference, a satellite communication link can only transmit or receive signals in one direction for a single access use. For example, in a frequency-division multiple access system, a separate bandwidth allocation for the local terminal and a separate bandwidth allocation for a remote terminal would be necessary for communication in both directions. However, the relayed-interference signal at the local transmitter terminal could be generated at the same terminal receiver to cancel this relayed interference. Such cancellation provides reuse of the frequencies in the local terminal bandwidth allocation for return link communication between the remote terminal and the local terminal. However, the power amplifier in the local transmitter is not perfectly linear and may limit the amount of cancellation of the relayed interference and preclude frequency reuse of the downlink channel. The power amplifier can be characterized by a zero-memory nonlinearity. The transmit/receive channel includes linear filtering both before and after the non-linearity, resulting in a dispersive nonlinear channel. The dispersive nonlinear distortions in such a channel cannot be eliminated by either linear filtering or zero-memory nonlinear compensation at the receiver. Thus, any nonlinear compensation to increase the cancellation level will require techniques that can cope with dispersive nonlinear distortions.

Antenna sizes at the respective terminals, fade margin considerations, and modulation choices affect the level of achievable cancellation in these satellite systems. When the local terminal has a larger diameter antenna, with gain $G_H$, than the remote terminal with an antenna of gain $G_R$, the interference problem will generally be more difficult at the larger antenna terminal. For both signal directions the received bit energy is proportional to the antenna gain product $G_H G_R$ and the transmitted energy per bit. In data transmission with a fixed modulation type the bit error probability is proportional to the received bit energy. Since the antenna gain product is the same in both directions, the transmitted energy per bit can be about the same for the local-to-remote direction as for the remote-to-local direction. However, because the transponder relays the transmitted signal back to the same terminal, the relayed interference signal has received bit energy proportional to the local terminal antenna gain squared. Additionally, although the terminals share the same physical path resulting in the same fade statistics for each direction, differences in the terminal fading compensation systems can result in different power outputs and a more difficult interference problem for the terminal with the higher power. Finally, the data rate and/or the modulation types may be different requiring one of the terminals to transmit more power and thus increasing the interference problem at the associated receiver terminal. These asymmetrical factors in satellite-transponder applications can lead to relayed interference in a frequency-reuse application at the local terminal that is as much as 10 dB stronger than the desired signal from the remote terminal. In satellite systems, bit-error rate performance goals are typically within 0.3 to 0.5 dB of theoretical limits. The cancelled relayed-interference signal is approximately complex Gaussian distributed so that its power adds to the channel noise at the receiver. If 0.4 dB is allocated for performance degradation due to a residual relayed-interference signal alone, the cancellation must push the relayed-interference signal approximately 10 dB below the noise. For the additional 10 dB of interference discussed above relative to the desired remote terminal signal and a signal-to-noise ratio of 7 dB for the desired remote terminal signal, the required cancellation would be equal to 10+10+7=27 dB. Accordingly, compensation of dispersive nonlinear distortions are required if these distortions are greater than this −27 dB threshold.

Existing systems have been developed to provide multiple-access reuse in full-duplex satellite communication systems that operate with a loop-back transponder. These systems use either discrete-time information signals prior to modulation or continuous-time modulation signals prior to the power amplifier to produce a reference signal for purposes of cancellation of the relayed interference at the receiver. U.S. Pat. No. 5,596,439 ("the '439 patent") describes an open-loop technique consisting of measurement techniques followed by interference reduction based on measured link parameters that are applied to the reference signal. The technique described is for applications where "the relay channel is assumed to be linear" so that the receiver composite signal contains "a copy of said source signal". In nonlinear systems the signal to be cancelled is distorted such that the receiver composite signal does not contain a copy. The estimating means in the '439 patent is realized in Parameter Estimator 28 that measures the linear parameters of delay, frequency, phase, and gain. These parameters do not include nonlinear distortions effects so cancellation levels are limited. Further, errors in open-loop parameter measurement such as Parameter Estimator 28 can significantly degrade subsequent interference reduction relative to a canceller operating in an adaptive closed-loop system.

U.S. Pat. No. 6,859,641 and U.S. Pat. No. 7,228,104 each describe an adaptive cancellation system that converts a sample of the IF transmitted signal to digital form and converts the IF received signal containing the relayed interference to digital form. Frequency, phase, gain, and delay parameters of the sample of the transmitted signal are adjusted to produce a compensating signal that is added to the digital form received signal to produce a signal of interest. The signal of interest can be converted back to an intermediate frequency for interface with a down-stream demodulator. The technique described in these patents does not address distortions due to nonlinearities in the local terminal power amplifier. The reference signal used for cancellation has not passed through the power amplifier nonlinearities and the resulting nonlinear distortions cannot be removed.

In these prior art systems it may be necessary to significantly reduce the power amplifier operating level to insure that the nonlinear distortions are small enough to allow for channel reuse. Such "backoff" of the power amplifier is undesirable because of loss of fade margin.

U.S. Pat. No. 7,522,877 ("the '877 patent") describes an interference-reduction system for the local terminal in the satellite communication configuration described above. The interference-reduction system digitizes and converts to baseband the local terminal IF transmit signal and transfers the bits in the baseband digital signal to a buffer in the local receiver to produce a replica of the local transmitted signal. The replica is then scaled, delayed and distorted to reduce the transponder-relayed local interference signal in a received signal that also contains multiple remote terminal signals. Since the interference reduction is over the local signal bandwidth rather than a single remote terminal signal subband, the effects of nonlinearities in the local transmitter can critically limit interference reduction. Accordingly, the '877 patent describes the generation of AM-Normgain and AM-PM correction arrays that are used for the distortion modification of the local transmitted signal replica.

According to the above described techniques, optimum receiver filtering and subsequent demodulation of the remote-terminal signal is not disclosed and the interference cancellation is over the signal bandwidth of the local terminal signal. The optimum receiver filter for the remote terminal signal is the matched filter $f_D^*(-t)$ corresponding to the remote-terminal transmit filter with impulse response $f_D(t)$. In digital data systems, it is desirable to perform cancellation upon discrete-time signals after optimum receiver filtering and sampling rather than upon the associated continuous-time signal prior to receiver filtering and discrete-time sampling. The optimum filtering minimizes the additive channel noise that can degrade cancellation performance and improves cancellation when the interference signal-signal bandwidth is greater than the desired-signal bandwidth.

Distortions produced by a signal that traverses a nonlinear channel are often characterized by a Volterra series expansion. The Volterra series is a generalization of the classical Taylor series. See "Nonlinear System Modeling Based on the Wiener Theory", Proceeding of the IEEE, vol. 69, no. 12, pp. 1557-1573, December 1981. U.S. Pat. No. 3,600,681 describes a nonlinear equalizer based on a Volterra series expansion of nonlinear intersymbol interference (NISI) in a data communication system. In "Adaptive Equalization of Channel Nonlinearities in QAM Data Transmission Systems", D. D. Falconer, Bell System Technical Journal, vol. 57, No. 7, September 1978, ("Falconer"), the Volterra series for NISI is used in a passband decision feedback equalizer. This equalizer is adapted by adjusting the coefficients of the Volterra series expansion by a gradient algorithm. In Falconer, it was concluded that "the number of nonlinear terms . . . is potentially enormous" and that "the simulation results indicated that inclusion of a large number of nonlinear terms, . . . may be necessary." The complexity of the Volterra series expansion for either voiceband telephone channels or satellite channels with nonlinear power amplifiers has been recognized in "Efficient Equalization of Nonlinear Communication Channels, W. Frank and U. Appel, 1997 IEEE International Conference on Acoustics, Speech, and Signal Processing, vol. III, Apr. 21-24, 1997 ("Frank"). In Frank, it is described that a decision feedback equalizer (DFE) uses a nonlinear structure that is a good approximation to the general Volterra filter but with reduced complexity. The nonlinear structure is based on an equivalent low-pass model of a $3^{rd}$ order bandpass nonlinearity. Because this Volterra series approximation provided better improvements at higher signal-to-noise ratio, it is concluded in Frank that the Volterra approximation DFE is better suited to the voiceband telephone channel than radio communications.

Rather than provide compensation for nonlinear distortions at the receiver by using nonlinear equalizers, there are predistortion techniques that can be applied in the transmitter before the nonlinear channel. In "A Data Predistortion Technique with Memory for QAM Radio Systems", IEEE Trans. Communications, Vol. 39, No. 2, February 1991, G. Karam and H. Sari ("Karam"), explicit expressions are derived for the $3^{rd}$ and $5^{th}$ order inverse Volterra kernels. Karam also notes that the finite-order inverses grow "very rapidly" with the Volterra order p and the discrete-time signal memory span K. These small order/memory span Volterra inverses are compared in Karam with a lookup memory encoder (referred to as "global compensation" in Karam) that predistorts each possible discrete-time signal data value such that at the discrete-time channel output the center of gravity of the received points is in the correct position in the discrete-time signal constellation. The RAM implementation of the lookup memory encoder requires K $\log_2$ M address bits where M is the modulation alphabet size. By using a rotation technique based on the center discrete-time signal in the memory span, the number of address bits can be reduced in M-ary QAM by two because of quadrature symmetry. For a given memory span and a practical number of address bits, it is described in Karam that the lookup memory encoder outperforms the Volterra inverse predistortion. However, Karam does not describe a technique for initializing and adapting the lookup memory encoder in the presence of additive noise. Unfortunately, the preamble length for initialization of a predistortion lookup memory encoder can be excessively large. The preamble length is on the order of $AM^{K-1}$ discrete-time signals where A is the averaging time to make the additive noise small compared to an acceptable level of residual distortion. A typical averaging time of 100 discrete-time signals for 8 PSK with K=5 would require a preamble of over 400,000 discrete-time signals. This difficulty with initialization and adaptation of distortion compensation systems using lookup table techniques is also noted in "Modeling and Identification of a Nonlinear Power-Amplifier with Memory for Nonlinear Digital Adaptive Pre-Distortion", Proceedings of the SPAWC Workshop, 15-18 Jun. 2003, Rome Italy, by Aschbacher et al, ("Aschbacher"). Also recognizing the slow convergence and large number of coefficients in the Volterra series expansion, it is suggested in Aschbacher to identify a nonlinear power amplifier by a simplified Wiener-model consisting of a linear filter followed by a zero-memory nonlinearity. An adaptive Least Means Squares algorithm is used to adapt and track parameters in the linear filter and the zero-memory nonlinearity to minimize the mean square error between the sampled data output of the nonlinear power amplifier and the simplified Wiener-model. This minimization is over the signal bandwidth rather than the smaller discrete-signal bandwidth and the minimization does not include receiver filtering contributions to the nonlinear intersymbol interference. As a result interference cancellation with the Aschbacher identification model would not be as effective as a technique that is receiver based and minimizes a mean square error in the received discrete-time signal values.

An amplitude-base power series expansion of a discrete-data reference signal after passing through a dispersive nonlinear channel is described in U.S. patent application Ser. No. 14/073,247. A distorted-signal estimator uses the power-series expansion n Estimator to estimate distorted-interference signals that result from a relayed-interference digital-data component in a received signal. The estimator, described in U.S. patent application Ser. No. 14/073,374 ("the '374 application") includes distortion weights that depend on the particular modulation constellation in use. The distortion weights are adaptively determined using a Least-Means-Squares (LMS) solution. Satellite-transponder communication systems conventionally use adaptive coding/modulation techniques that result in a sudden change in the modulation constellation, which then requires readaptation of the distortion weights. This readaptation can be accomplished with an LMS direct solution as described in the '374 application. The solution requires storage of parameter matrices for each constellation that becomes burdensome for the large number of modulation constellations used in these satellite-transponder communication systems.

Accordingly, there is a need at a receiver terminal in certain digital communication systems for desired-signal demodulation that includes cancellation of nonlinear distorted interference that is constellation-independent for conditions where an undistorted version of the interference can be produced. Further, it would be desirable to utilize nonlinear techniques that provide faster convergence of the nonlinear series expansion and better performance than prior art systems based on conventional Volterra series expansion techniques. Additionally, it would be desirable that these nonlinear techniques can be initialized and adapted to changing conditions more effectively than prior art lookup memory techniques.

SUMMARY

It is an object of the invention to provide a receiving apparatus and method for the demodulation of a bandpass desired signal that is included in a received signal that also includes a bandpass distorter-interference signal that has been distorted by a nonlinear channel. The desired and interference signals use digital modulation that includes modulating the digital data to discrete-time signals followed by linear filtering using a waveform filter to produce continuous-time signals. At a receiver, the continuous-time received signal is linear filtered and time-sampled to produce a discrete-time receiver signal which includes a distorted-interference signal, a desired signal, and a noise signal. In the invention the receiver also has available signal components of the bandpass interference signal that are used to produce a source signal that is associated with the distorted-interference signal. Another object of the invention is to provide a technique for estimating the distorted-interference signal from the source signal using a series expansion of the nonlinearity. This object includes providing improved convergence and performance relative to a conventional Volterra series expansion. Another object of the invention is to provide for efficient initialization and constellation-independent adaptation of the distorted-interference signal stimulation. Another objet of the invention is to provide optimum demodulation of the bandpass-desired signal while using the distorted-interference estimate to provide interference cancellation.

According to the present invention, in a satellite terminal that generates in a source-transmitter a digital-data source signal that is modulated to a modulated-source signal and, subsequently, filtered and converted to a bandpass signal and distorted in a nonlinear power amplifier to produce a bandpass distorted-interference signal, a receiving is provided, that includes, at least, a receiver filter/sampler with a receiving-timing clock for filtering, with a matched filter, a received signal containing a bandpass desired signal derived from a desired-signal digital data signal with a data period $T_D$ seconds and the delayed bandpass distorted-interference signal to produce a period-$T_R$, $T_R < T_D$, discrete-time receiver signal, wherein the matched filter has a complex conjugate, time-inverted impulse response of a waveform filter, and a synchronizer/sampler for sampling at a rate of $1/T_R$ the modulated-source signal and comparing the sampled modulated-source signal with the period-$T_R$ discrete-time receiver signal to produce a transmission time delay that is applied to the sampled modulated-source signal to produce a synchronized-interference signal, and a vector power series generator that produces a power vector with components that depend on the magnitude of the synchronized-interference signal, and a source multiplier that multiplies the synchronized-interference signal and the power vector to produce an interference vector, and an interference filter that filters the interference vector with the matched filter to produce a matched-interference vector, and a weight generator that produces a vector of distortion weights that depend on the matched-interference vector, and a vector dot-product multiplier that produces a period-$T_S$ distorted-interference signal from the interference vector and the vector of distortion weights, and a combiner that sums the distorted-interference signal and the discrete-time receiver signal to produce a residual-interference signal, and a desired-signal demodulator for demodulation of the residual-interference signal to produce estimates of the desired-signal digital data.

According to the present invention in a satellite-transponder communication system that includes at a local terminal a digital-data source signal that is modulated to a modulated-source signal and, subsequently, filtered and converted to a bandpass signal and distorted in a nonlinear power amplifier to produce a bandpass distorted-interference signal, a method is provided that includes receiver filtering at the local terminal a received signal containing a bandpass desired signal derived by waveform filtering a desired-signal digital data signal produced at a remote terminal and the delayed bandpass distorted-interference signal to produce a discrete-time receiver signal, and sampling the modulated-source signal and comparing the sampled modulated-source signal with the discrete-time receiver signal to produce a transmission time delay that is applied to the sampled modulated-source signal to produce a synchronized-interference signal, and power generating a power vector with components that depend on the magnitude of the synchronized-interference signal, and multiplying the synchronized-interference signal and the power vector to produce an interference vector, and interference filtering the interference vector to produce a filtered-interference vector, and weight generating a vector of distortion weights that depend on the filter-interference vector, and dot-product multiplying the interference vector and the vector of distortion weights to produce a distorted-interference signal, and combining the distorted-interference signal and the discrete-time receiver signal to produce a residual-interference signal; and demodulating the residual-interference signal to produce estimates of the remote-terminal desired-signal digital data.

According to the present invention, a transceiver for generation of a bandpass-interference signal, non-linear distortion interference cancellation, and demodulation of a cancelled signal, includes: a source modulator that produces the bandpass-interference signal from a modulated-source signal; a receiver filter/sampler, with a receiver-timing clock having a matched filter for filtering a received signal containing a bandpass distorted-interference signal, which results from passing the bandpass-interference through a nonlinear amplifier, and containing a bandpass desired signal, which is derived from desired-signal digital data, and which has a modulation period of $T_D$ seconds and is filtered with a waveform filter, which produces a period-$T_R$, $T_R < T_D$, discrete-time receiver signal, wherein the matched filter has a complex conjugate, time-inverted impulse response of the waveform filter; a synchronizer/sampler that samples at a rate of $1/T_R$ the modulated-source signal and compares the modulated-source signal with the period-$T_R$ discrete-time receiver signal to produce a transmission time delay applied to the modulated-source signal thereby producing a synchronized-interference signal; a vector power series generator that produces a power vector having components dependent on the magnitude of the synchronized-interference signal; a source multiplier that multiplies the synchronized-interference signal and the power vector to produce an interference vector; a matched filter that filters the interference vector with the waveform filter to produce a matched-interference vector; a weight generator that produces a vector of distortion weights dependent on the matched-interference vector; a vector processor that produces from the vector of distortion weights a distorted-interference signal depending on the interference vector; a combiner that sums the distorted-interference signal and the discrete-time receiver signal to produce a residual-interference signal; and a desired-signal demodulator for demodulating the residual-interference signal to produce estimates of the desired-signal digital data.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein reference numbers refer to the same, or equivalent, parts of the present invention throughout the various drawings, and wherein.

DETAILED DESCRIPTION OF THE INVENTION

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, In order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Hereinafter, exemplary embodiments of the present disclosure will be described with reference to the accompanying drawings. However, the drawings to be described below and the following detailed description relate to one exemplary embodiment of various exemplary embodiments for effectively explaining the characteristics of the present invention. Therefore, the present invention should not be construed as being limited to the drawings and the following description.

Further, in the following exemplary embodiments, the terminologies are appropriately changed, combined, or divided so that those skilled in the art may clearly understand them, in order to efficiently explain the main technical characteristics of the present invention, but the present invention is not limited thereto.

Signal Demodulation with Nonlinear-Distorted Interference

The present invention demodulates a bandpass desired signal in the presence of interference that results from a modulated-source signal that has been nonlinear distorted. The demodulation exploits knowledge of the interference to estimate a discrete-time nonlinear-distorted interference signal in a received signal that also includes the bandpass desired signal.

Figure 1:
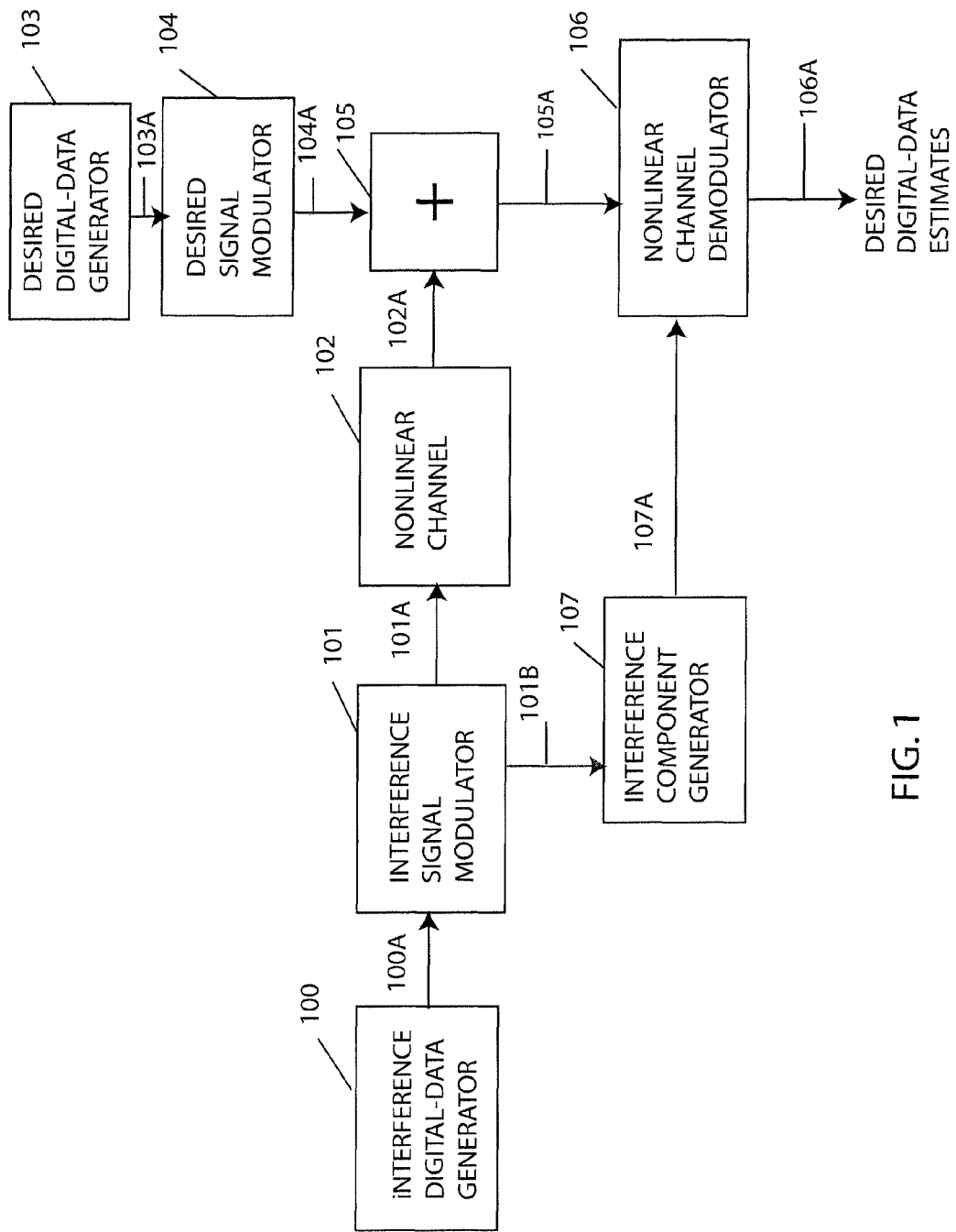
FIG. 1 is a block diagram of a general communication system in which demodulation of a desired signal is accomplished in the presence of a nonlinear-distorted interference signal using a distortion-free version of the interference signal.

The interference estimate is used to cancel enough of the distorted interference so that demodulation of the bandpass desired signal can be accomplished. A general application of the invention is shown in FIG. 1. A digital data generator 100 produces a source signal of digital data values that are information values or error-corrected coded values. The digital data source signal may also contain synchronizing and framing digits that are required in communication systems. In a transmitter the digital data source signal 100A is provided to source signal modulator 101 for conversion to a bandpass interference signal 101A. In the source signal modulator 101 the digital data source signal 100A is constellation modulated to produce a modulated-source signal 101B, which includes periodic discrete-time modulation symbols, that, in turn, is passed through an interference-signal waveform filter and frequency upconverted to produce the bandpass interference signal 101A. The modulated-source signal 101B is also provided to nonlinear channel demodulator 106 located in a receiver for purposes of interference cancellation. Returning to the transmitter, the bandpass interference signal 101A is nonlinear distorted in nonlinear channel 102 to produce the bandpass distorted-interference signal 102A. In a similar manner, a desired digital data generator 103 produces desired signal digital data 103A that is modulated in a desired signal modulator 104 to produce a modulated-desired signal that is, subsequently, passed through a desired-signal waveform filter and frequency upconverted to produce the bandpass desired signal 104A.

In the present invention, the constellation alphabet for the modulated-source and modulated-desired signals is complex, for example, quadrature modulation techniques such as Quadrature Phase-Shift Keying (QPSK), M-ary PSK, and Quadrature Amplitude Modulation (M-QAM). Some quadrature modulation constellation alphabets, unity-magnitude normalized, are given in Table 1.

TABLE 1

Example Constellation Alphabets

| Modulation | Alphabet |
|---|---|
| QPSK | $(\pm 1 \pm j)/\sqrt{2}$ |
| 8-PSK | $e^{jn\pi/4}$, n = 0, 1, 2, . . . , 7 |
| 16-QAM | $(\pm 1 \pm j)/\sqrt{2}$ |
|  | $(\pm 1 \pm j/3)/\sqrt{2}$ |
|  | $(\pm 1/3 \pm j)/\sqrt{2}$ |
|  | $(\pm 1/3 \pm j/3)/\sqrt{2}$ |

In general, the present invention includes any digital-data modulation technique that can be expressed by means of an alphabet with a finite set of complex numbers. Thus, the invention is also applicable to differentially encoded (DE) constellations alphabets such as DEQPSK.

A waveform filter converts a discrete-time modulated signal to a continuous-time signal and also provides spectral limitations for subsequent radio transmission after frequency upconversion. A waveform filter is characterized by its filter impulse response. Consecutive discrete-time signals are applied in the form of an impulse train to the waveform filter to produce a series of successive waveforms that forms the continuous-time signal. The constellation period and timing phase of the discrete-time modulation signal are determined by a constellation clock with nominal source-constellation period $T_S$. The discrete-time values, $i_n$, n integer, in the modulated-source signal correspond to discrete times $nT_S$, in modulated-source signal 101B, are used as described above to produce the bandpass interference signal 101A at the output of the source signal modulator 101. The bandpass interference signal 101A includes a train of consecutive waveforms that occur at a constellation rate $1/T_S$ and overlap each other in time. Each waveform in the train has an associated source constellation value $i_n$, n integer, selected from the selected constellation alphabet.

Defining the impulse response of a source-signal waveform filter in source-signal modulator 101 as $f_S(t)$, the complex notation representation of the bandpass interference signal 101A is $$i(t)=\Sigma^{\infty}_{n=-\infty}i_n f_S(t-nT_S+\Delta_S), \quad (1a)$$

where the constellation timing phase is $\Delta_S$. The bandpass interference signal 101A at a carrier radian frequency of $\omega_0$ and carrier transmit phase of zero degrees is converted from complex notation as $$i_B(t)=Re\{i(t)e^{j\omega_0 t}\}. \quad (2a)$$

If the waveform impulse response $f_S(t)$ has a roll-off factor of $r_S$, the bandpass (two-sided) bandwidth of the bandpass interference signal is approximately $B_S=(1+r_S)/T_S$, $0<r_S<1$. Typical values for roll-off factors are 0.1 to 0.3. The interference-signal bandwidth $B_S$ can be greater than a desired-signal bandwidth. One expects, in this case, that cancellation to produce the desired signal will be better over the desired-signal bandwidth than over the interference-signal bandwidth as accomplished in certain prior art systems.

In the present invention the bandpass distorted-interference signal interferes with the bandpass desired signal that also has the complex-constellation modulation format. The discrete-time desired signals in the desired signal modulator 104 are filtered by a desired-signal waveform filter with impulse response $f_D(t)$ and with a constellation period $T_D$ that may be approximately the same, smaller, or greater than $T_S$. In general, there is also a timing phase represented by the time delay $\Delta_D$ where the magnitude of $\Delta_D$ is less than or equal to $T_D/2$. The discrete-time desired-signal constellation values transmitted at the discrete times $nT_d$ are defined as $q_n$, n integer, so that after desired-signal waveform filtering the bandpass desired signal $q(t)$, 104A represented in complex notation is $$q(t)=\Sigma^{\infty}_{n=-\infty}q_n f_D(t-nT_D+\Delta_D). \quad (1b)$$

The bandpass desired signal 104A is at a slightly different carrier radian frequency $\omega_1$ and has a carrier phase of $\psi$ degrees:

$$q_B(t)=Re\{q(t)e^{j\omega_1 t+j\psi}\}. \quad (2b)$$

The carrier frequencies $\omega_0$ and $\omega_1$ are sufficiently close such that the bandpass interference and desired signals share a significant portion of the same bandwidth.

In radio communication systems, the bandpass interference signal 101A traverses the nonlinear channel 102 that in the present invention results in the bandpass distorted-interference signal 102A. An important example of nonlinear channel 102 is a power amplifier in the transmitter of a radio system. In a radio system, the bandpass interference signal 101A has been up-converted to a selected radio center frequency for transmission. In general, power amplifiers are linear for smaller input signals but produce amplitude and phase distortions for larger input signals until a saturation level is reached where no further output amplitude increase is possible. This nonlinear effect can be accurately modeled by a zero-memory nonlinear function between the input signal amplitude and the output amplitude and phase. In this amplitude-phase model as described by A. L. Berman and C. H. Mahle, "*Nonlinear phase shift in traveling-wave tubes as applied to multiple access communication satellites*", IEEE Trans. Communications Technology, vol. COM-18, p. 37-48, February 1970, an input bandpass signal corresponding to the interference signal of Equation (1a) can be written in complex notation as $$i(t)=r(t)e^{j\Theta(t)}, \quad (3)$$

where r(t) and θ(t) are the signal amplitude and phase, respectively. The corresponding complex-notation representation of the bandpass distorted-interference signal for this amplitude-phase model is $$\hat{i}(t) = A[r(t)] e^{j\theta(t) + j\Phi(r(t))}, \quad (4)$$

where A(r) is a nonlinear function of r, with a leading linear term, representing amplitude distortion and Φ(r) is a nonlinear function of r, representing phase distortion.

Figure 2:
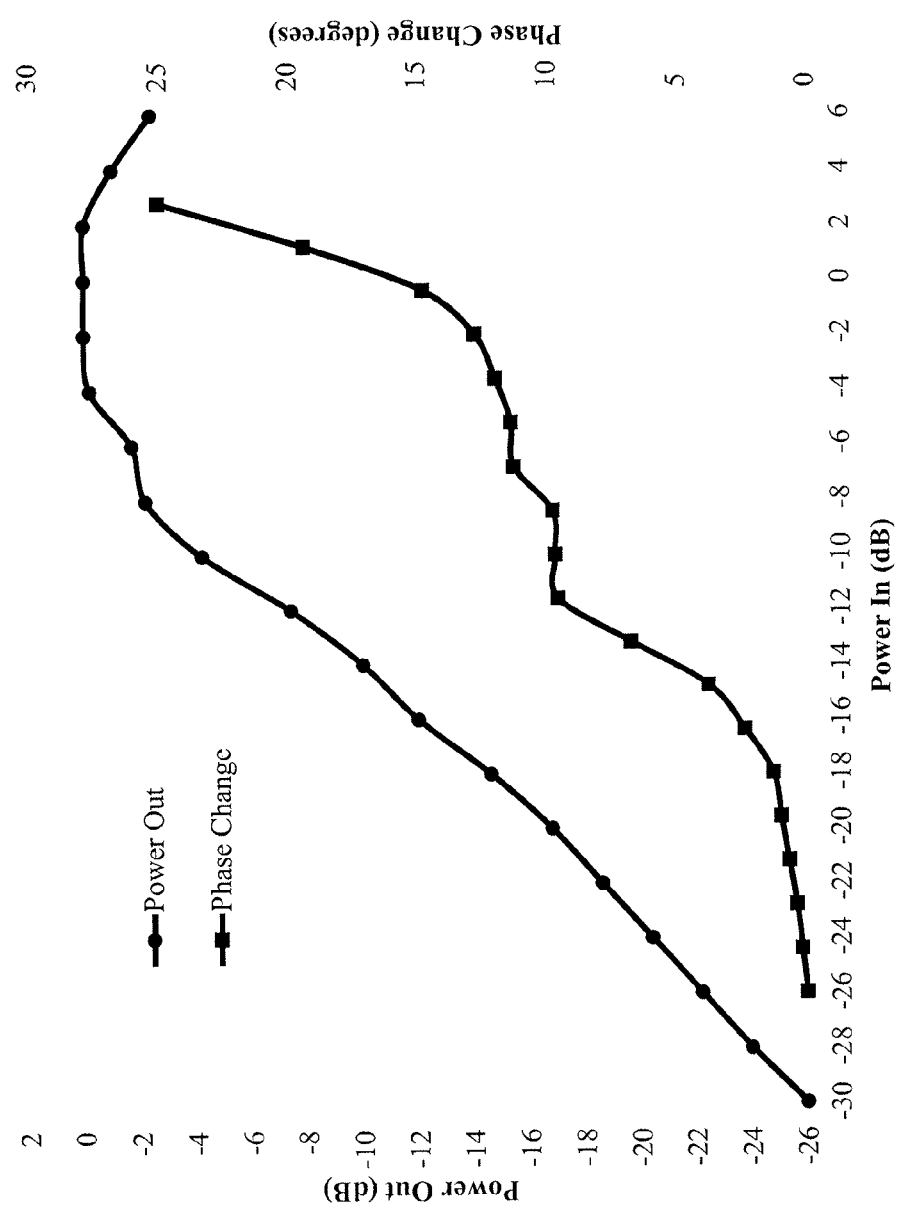
FIG. 2 (PRIOR ART) is a graph of the amplitude and phase outputs as a function of input power for an exemplary power amplifier corresponding to the nonlinear channel of FIG. 1.

An example of this amplitude-phase model is provided in European Standard ETSI EN 302 307 v 1.2.1, (2009-08), Digital Video Broadcasting [DVB], page 73, as a Tracking Wave Tube (TWT) amplifier model to be used in satellite communication system computer simulations. The Ku-band linearized TWT amplifier amplitude A (r) and phase Φ (r) functions are reproduced here from DVB, Figure H.11 as FIG. 2.

Although the power amplifier nonlinearity has zero memory, i.e., the amplitude and phase distortion depend only on the amplitude r at any instant of time, linear filtering, prior to the nonlinear channel (amplifier) 102 in the source signal modulator 101 and linear filtering after the nonlinear channel 102 in the communication medium and a receiver, will result in a dispersive nonlinear channel.

Returning to FIG. 1, the bandpass desired signal 104A is combined in a summer 105 with the bandpass distorted-interference signal 102A produced by the nonlinear channel 102. In general in order to accommodate different transmitted data rates, the constellation alphabets and signal periods of the respective interference and desired signals may be different. The bandpass distorted-interference signal 102A precludes successful demodulation of the desired digital-data at a subsequent receiver. Accordingly, the summer 105 produces a received signal 105A that is processed by nonlinear channel demodulator 106 whose function is to cancel at discrete sampling times, to an acceptable level, a discrete-time distorted-interference signal that result from frequency downconverting, filtering, and sampling of the received signal. Subsequent demodulation of a discrete-time desired signal can then be accomplished. This demodulation results in desired digital-data estimates 106A of the desired digital data 103A. The cancellation is made possible by utilizing the modulated-source signal 101B that produces the bandpass interference signal 101A. The modulated-source signal 101B in the transmitter is provided to the nonlinear channel demodulator 106. Alternatively, the modulated-source signal 101B can be produced in a separate constellation modulator from the digital-data source signal.

Figure 3:
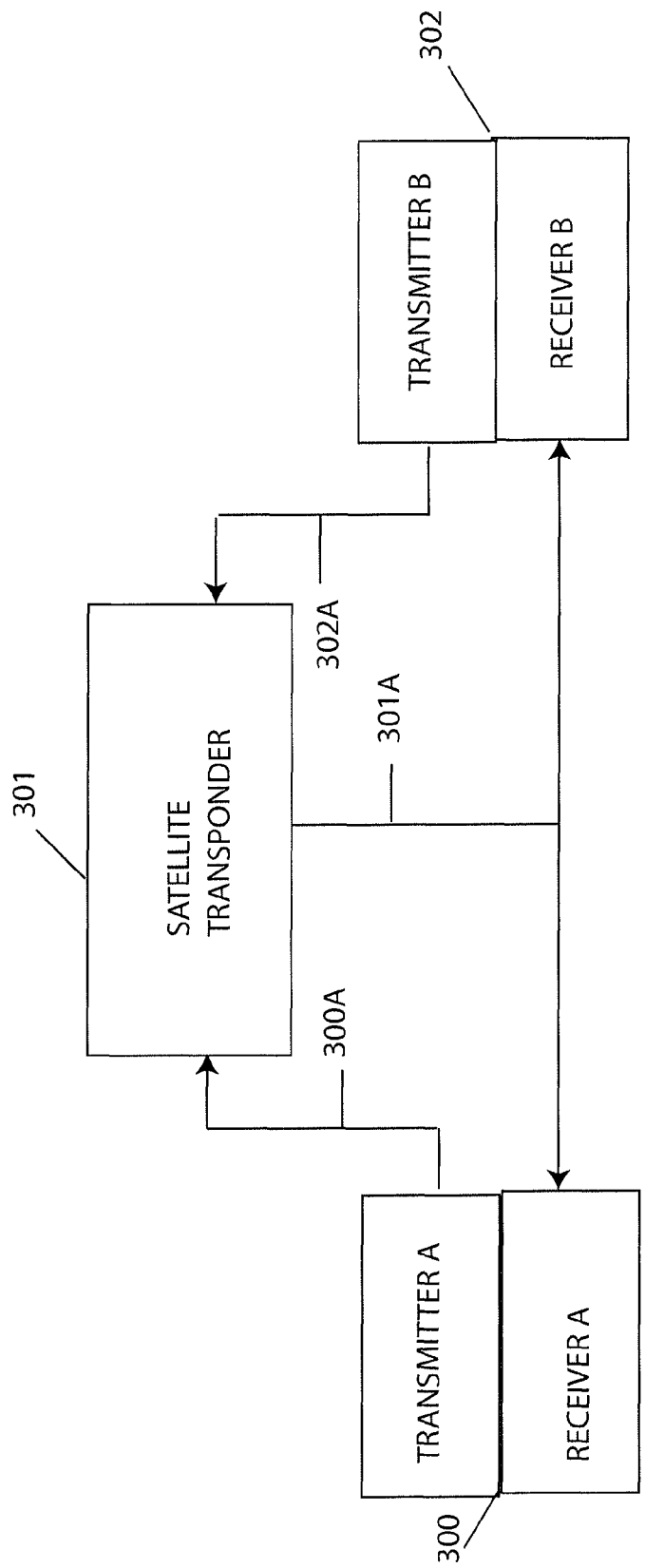
FIG. 3 is a block-diagram of exemplary satellite terminals operating in a loopback transponder configuration, including a channel reuse of the general communication system of FIG. 1.

An important radio communication example of the general interference system of FIG. 1 is a satellite-transponder communication link with a local terminal 300 transmitting to a satellite transponder 301 and connecting to a remote terminal 302, as shown in FIG. 3. The transmitter/receiver (Transmitter A and Receiver A) at the local terminal 300 and the transmitter/receiver (Transmitter B and Receiver B) at the remote terminal 302 provide full duplex communication through satellite transponder 301. The transponder operation is limited to bandpass filtering, frequency translation, and amplification. In a frequency-division multiple-access application the local transmitter sends source signals in a local-terminal signal in frequency band F1 from the local terminal 300 on a link 300A to the satellite transponder 301. The satellite transponder 301 then relays back the filtered and amplified local-terminal signal in frequency band F2 on a downlink 301A to the receiver at the local terminal 300 and also forwards the signal to a receiver at the remote terminal 302. In full duplex operation an uplink 302A is used by the remote terminal 302 to send a transmit signal in frequency band F1. This signal after frequency translation to frequency band F2 will be sent to the receiver at local terminal 300 and will occupy the same frequency band in downlink 301A as the relayed local-terminal signal that is the bandpass distorted-interference signal 102A of FIG. 1. In order to reuse frequency band F2 in this manner with the bandpass desired signal 104A from the remote terminal, it is necessary to cancel the relayed local-terminal signal by exploiting the available signal characteristics at the transmitter in the local terminal 300. In the present invention, the availability of source signals, that result in the interference, in the local terminal 300 transmitter A is exploited in the local terminal 300 receiver A for subsequent interference cancellation and subsequent desired signal demodulation. Many satellite-transponder communication systems have the transmitter and receiver subsystems collocated in one physical transceiver device facilitating the transfer of source signals. In the present invention satellite-transponder communication systems include point-to-point applications where the respective link terminals transmit to each other within similar bandwidths and certain point-to-multipoint applications.

Figure 4:
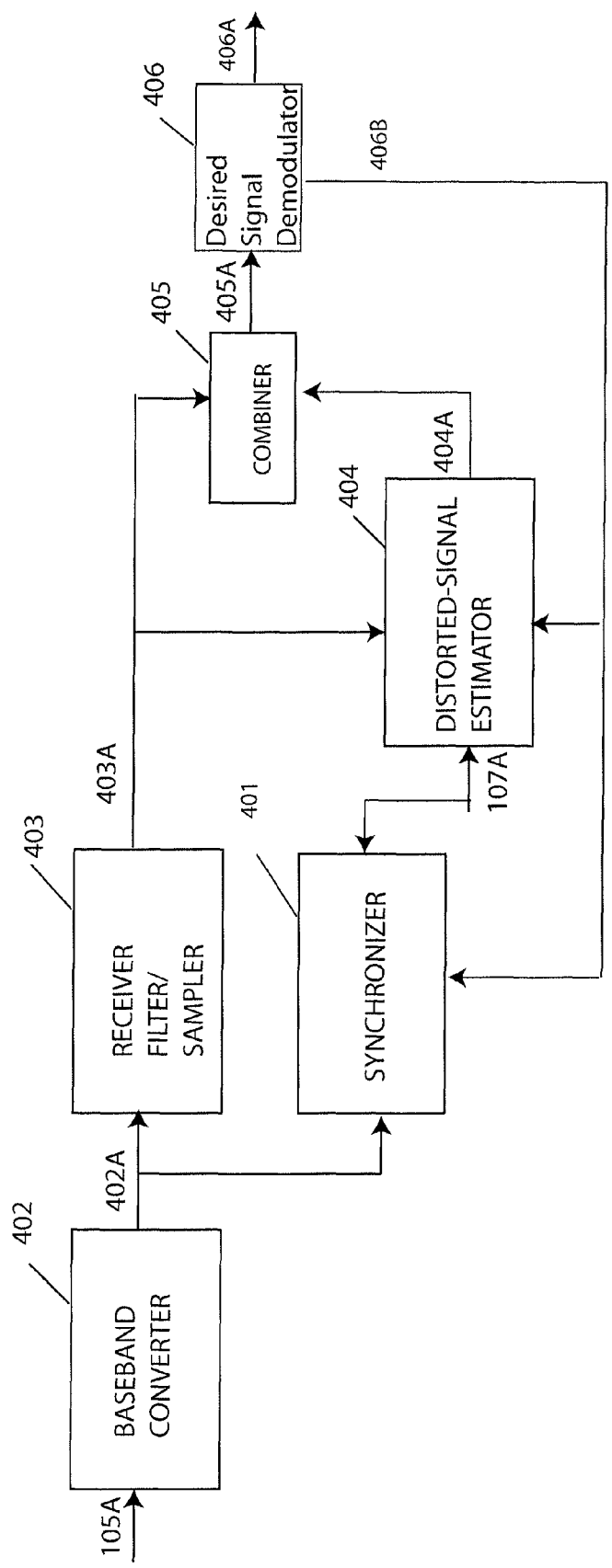
FIG. 4 is a block diagram of the exemplary nonlinear channel demodulator of FIG. 1.

Conversion of Bandpass to Discrete-Time Signals in the Nonlinear-Channel Demodulator FIG. 4 is an example of the nonlinear channel demodulator 106 in FIG. 1. A baseband converter 402 converts the received signal 105A to a baseband signal 402A and performs gain adjustment, frequency/phase synchronization, and timing-phase synchronization for the desired signal path. The frequency/phase synchronization estimates and removes the carrier frequency $\omega_1$ and the associated channel phase with respect to the bandpass desired signal 104A that is a component in the received signal. Timing synchronization aligns and tracks variations relative to the modulated-desired signal in the received signal 105A to determine the received-constellation discrete-time signal rate $(1/T_D)$ and the timing phase.

Baseband/digital conversion is achieved by filtering and sampling the baseband signal 402A in receiver filter/sampler 403. In the present invention the waveform filter $f_D(t)$ in desired signal modulator 104 is used for matched filtering. The matched filter is the complex conjugate, time-inverted impulse response $f_D^*(-t)$, where $f_D(t)=0$, $t<0$. Because the matched filter is anticausal, a practical implementation requires the introduction of an implementation delay. Accordingly, both interference and desired signals in the received signal are filtered with the matched filter in receiver filter/sampler 403. The sampling period $T_R$ after the matched filter is consistent with the Nyquist bandwidth limit such that $T_R < T_D$. A typical value is $T_R = T_D/2$. The discrete-time receiver signal 403A at the output of receiver filter/sampler 403 has receiver constellation values, $r_n$, n integer, at the receiver sampling rate $1/T_R$. Each receiver constellation value includes a noise value, a distorted-interference value $\hat{i}_n$, and a receiver desired-signal value.

The discrete-time receiver signal 403A and the modulated-source signal 101B are provided to the synchronizer/sampler 401. The modulated-source signal 101B is gain adjusted, frequency/phase adjusted, and resampled at the receiver sampling rate $1/T_R$. The determination is then accomplished of the transmission time delay between distorted-interference value $\hat{i}_n$ and the corresponding $T_R$-period sample value in resampled modulated-source signal. The tracking of the transmission time delay is accomplished in synchronizer/sampler 401 by correlation of the discrete-time receiver signal 403A and the modulated-source signal 101B. The gain adjustments and frequency/phase adjustments only require enough precision such that the correlation to determine the transmission time can be accomplished. The transmission time delay is then applied to the resampled modulated-source signal to produce a synchronized-interference signal 403 at the output of synchronizer/sampler 401. The synchronized-interference signal 401A has interference constellation values, $i_n$, n integer, at the receiver sampling rate $1/T_R$. The synchronized-interference signal 403 is provided to distortion-signal estimator 404 that, in turn, produces estimates 404A of the distorted-interference constellation values $\hat{i}_n$. For perfect tracking of the transmission time delay and under an idealized condition where the nonlinear channel 102 reduces to linear amplification, the distorted-interference constellation values $\hat{i}_n$ differ from the interference constellation values, $i_n$, only in gain and phase. Under this idealized condition, an adaptive linear weight multiplying the interference constellation values suffices for producing estimates for cancellation of the interference in the receiver constellation values. For cancellation under practical conditions the interference constellation values must be modified in some way to take into account the nonlinearity in nonlinear channel 102. The estimates of the distorted-interference constellation values at the output of distortion-signal estimator 404 are combined in combiner 405 with the receiver constellation values in the discrete-time receiver signal 403A to produce a residual-interference signal 405A. Residual-interference signal 405A, which contains a residual interference component and a desired signal component, is then provided to desired-signal demodulator 406 for demodulation resulting in estimates 406A of the desired signal digital data 103A.

Estimation of the Distorted-Interference Signals, Mathematical Development

The distorted-signal estimator 404 estimates the distorted-interference signal that result from the bandpass distorted-interference signal 102A component of the received signal, viz., the distorted-interference constellation values $\hat{i}_n$. These values are the result of passing the bandpass distorted-interference signal 102A through a zero-memory nonlinearity (nonlinear channel 102), followed by linear filtering and sampling in receiver filter/sampler 403. The synchronized-interference signal 403 has interference constellation values, $i_n$, n integer, at the receiver sampling rate $1/T_R$ so the bandpass interference signal 101A that is reproduced (with possible gain and phase differences) at the receiver as the synchronized-interference signal 401A, can be represented in complex notation in a $\sin(x)/x = \text{sinc}(x)$ expansion as $$i(t) = \sum_n i_n \text{sinc}\left(\frac{t}{T_R} - n\right). \tag{5}$$

The discrete-time receiver signal 403A has the continuous time representation $$r(t) = \alpha^*(|i(t)|)i(t) \tag{6}$$

The bandpass interference signal 101A i(t) is multiplied by a zero-memory nonlinearity complex value (see Equation 4, above) that depends on the magnitude of i(t). The additive term u(t) includes the desired signal and noise. The discrete-time received signal 403A is matched filter and sampled to produce the receiver constellation values in the discrete-time receiver signal 403A $$r_n = \int_{-\infty}^{\infty} f_D(nT_D - t)r(t)dt \tag{7}$$

In general, any appropriate receiver filter can be used in Equation 7 but in one embodiment the use of a filter matched to the desired-signal waveform filter insures that optimum demodulation of the desired signal can be accomplished after cancellation of the interference. The zero-memory nonlinearity can be represented by an Nth order series expansion expressed as an N-vector of base functions such that the first term in Equation 5, "a*i(t)", can be approximated by the dot product of an appropriate weight vector and the distorted interference vector $$\beta(t) = b(|i(t)|)i(t) \tag{8}$$

for an Nth order base vector b. For a power series expansion the vector components are $$b(n) = (|i(t)|)^{n-1} n = 1, 2, \ldots, N \tag{9}$$

Comparing with Equation 7 above, one can produce an optimization problem for finding the optimum weight vector by matched filtering and sampling to produce the matched-interference vector $$g_n = \int_{-\infty}^{\infty} f_D(nT_D - t)\beta(|i(t)|)i(t)dt. \tag{10}$$

The Minimum Mean square Error (MMSE) Nth order weight vector w is used to produce the MMSE distorted-interference constellation value by the dot product $$\hat{i}_n = w'g_n \tag{11}$$

and the error signal to be minimized is $$e_n = r_n - \hat{i}_n. \tag{12}$$

where the error signal is the residual-interference signal 405A. The MMSE criteria is $$\min_w E = \Sigma^{\infty}_{n=-\infty} |e_n|^2 \tag{13}$$

By the principle of orthogonality, the optimum weight vector solves the equation $$\sum_{-\infty}^{\infty} e_n^* * \frac{\delta e_n}{\delta w} = 0 \tag{14}$$

where $\delta e_n/\delta w$ is the gradient vector of the error signal with respect to the weight vector. From Equations (11) and (12), the gradient vector is the negative of the matched-interference vector $g_n$ so that Equation (14) becomes $$\Sigma^{\infty}_{n=-\infty}(w'g_n)^*g_n = \Sigma^{\infty}_{n=-\infty} r_n^* * g_n$$

If one defines the interference correlation matrix $$G = \Sigma^{\infty}_{n=-\infty} g_n g_n' \tag{15a}$$

and interference-correlation vector $$y = \Sigma^{\infty}_{n=-\infty} r_n^* * g_n, \tag{15b}$$

the MMSE solution is $$w = G^{-1}y. \tag{16}$$

A general description of MMSE weight calculation techniques including the direct Least Mean Squares (LMS) method Equation 16 and an estimated gradient algorithm are described in "Least Square Estimation with Applications to Digital Signal Processing", A. A. Giordano and F. M. Hsu, John Wiley, New York, N.Y., 1985. An estimated-gradient algorithm, also referred to as an iterative LMS algorithm, for computing the weight vector subtracts the negative of an attenuated gradient vector from the present weight vector to produce the next iteration weight vector. The iterative LMS algorithm for quadratic problems is $$w_{n+1} = w_n - \Delta e_n^* * \left(\frac{\delta e_n}{\delta w}\right) \quad (17)$$

which gives $$w_{n+1} = w_n - \Delta e_n^* * g_n$$

where $\Delta$ is a step size chosen to insure convergence. Thus, the optimum, in a mean square error sense, estimator of the distorted-interference constellation values $\hat{I}_n$ can be found with either the direct LMS solution by estimating G and y in Equation 15 to be used in the matrix solution Equation 16 or by the iterative LMS estimated gradient algorithm Equation 17. Note that these solutions do not depend on the constellation alphabet so they are constellation independent.

Description of the Distortion-Signal Estimator

Figure 5:
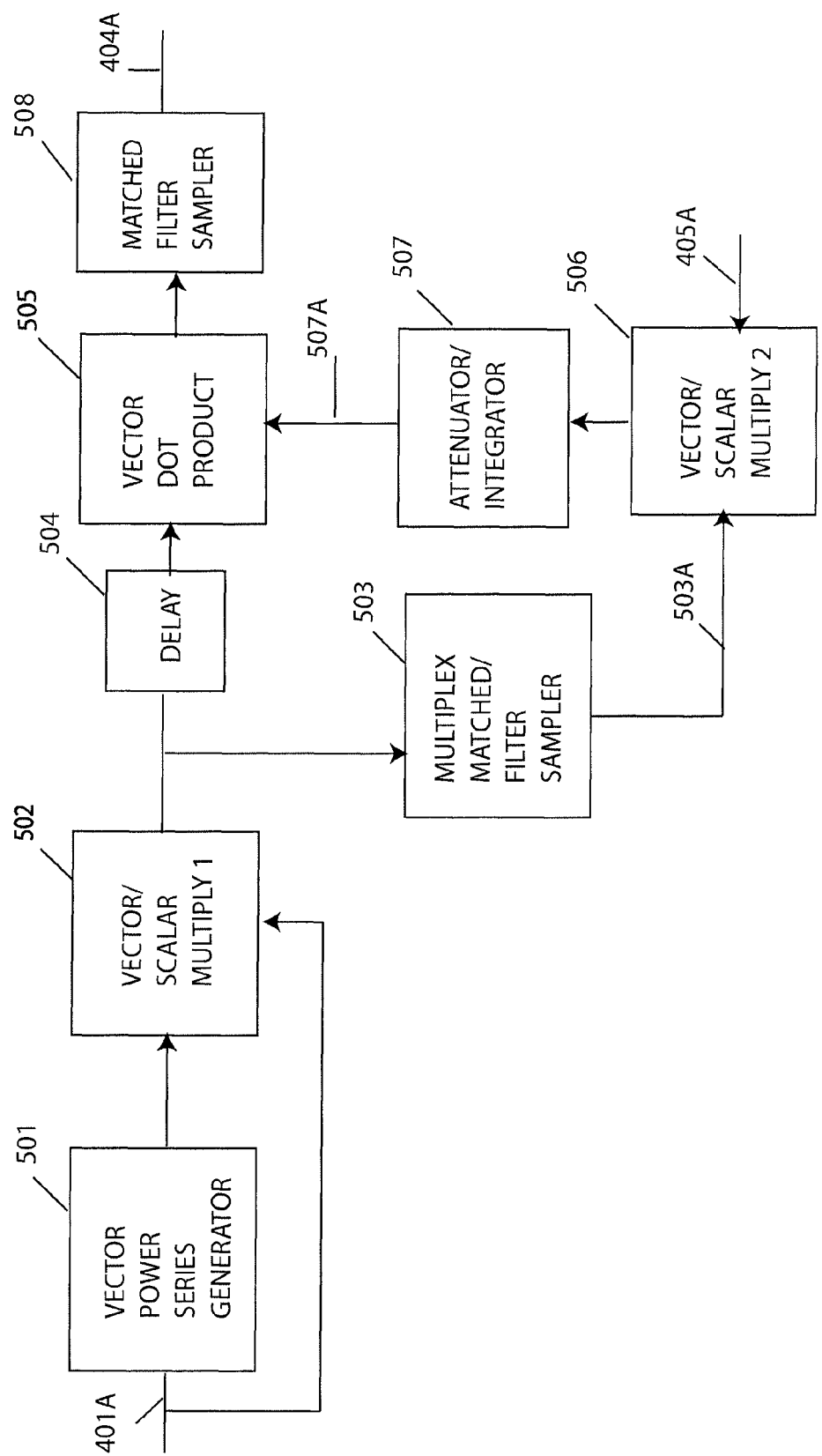
FIG. 5 is a block diagram of the exemplary distorted-signal estimator of FIG. 4.

In an embodiment the distorted-signal estimator 404 is implemented as shown in FIG. 5 with the iterative LMS solution of Equation 17. The synchronized-interference signal 401A that corresponds to the continuous signal i(t) in Equation 5 is input to vector power series generator 501 to produce the N-vector b with vector coefficients given by the power series Equation 9. The vector b is then multiplied in vector/scalar multiplier1 502 to produce the distorted-interference vector Equation 8. In an alternative embodiment the dot product Equation (11) and the iterative LMS algorithm require matched filtering of the N components of the distorted interference vector of Equation (8) in order to produce the matched filter interference vector $g_n$ of Equation (10). However in one embodiment in FIG. 5, it is noted that the dot product and matched filtering operations can be interchanged so that only one matched filter is required in the dot product path. The calculation of the matched-interference vector Equation 10 for use in the iterative LMS algorithm does require filtering of each vector component but can be accomplished in multiplex matched/filter sampler 503. Thus, the multiplex operation reduces complexity by requiring only two matched filters, rather than N matched filters in the alternative embodiment, with the result that a small but negligible delay is added to the iterative LMS algorithm. This multiplex delay is compensated for by delay unit 504. In accordance with iterative LMS algorithm Equation (17), the matched-interference vector 503A multiplies a constellation value in the residual-interference signal 405A in vector/scalar multiply2 506 to produce a series of constellation values that are attenuated by the step size $\Delta$ and integrated in attenuator/integrator 507 to produce the weight vector 507A of Equation 17. Vector dot product 505 performs the dot product of the delayed distorted interference vector and the LMS weight vector 507A. This dot product is then filtered in matched filter sampler 508 to produce estimates 404A of the distorted-interference constellation values $I_n$. These constellation values are combined in combiner 405 of FIG. 4 with the receiver constellation values in the discrete-time receiver signal 403A to produce the residual-interference signal 405A. Demodulation of the residual-interference signal 405A may require conventional frequency/phase corrections and resampling but the optimum matched filter operation has been already accomplished in Equation 7.

Performance of an Example System

In the satellite-transponder system described herein with respect to FIG. 3, frequency reuse and relayed interference cancellation provides the potential for doubling the data rate relative to conventional systems without frequency reuse. Such frequency reuse is only possible if the achievable cancellation of the relayed interference is large enough so that the residual interference after cancellation is small compared to the additive noise. At this level of cancellation the small signal-to-noise ratio degradation associated with doubling the data rate is acceptable. To verify the effectiveness of the frequency reuse system of FIG. 3, a MATLAB simulation was used to provide various orders of cancellation. The MATLAB simulation included a nonlinear power amplifier with the DVB standard nonlinearities shown in FIG. 2.

Figure 6:
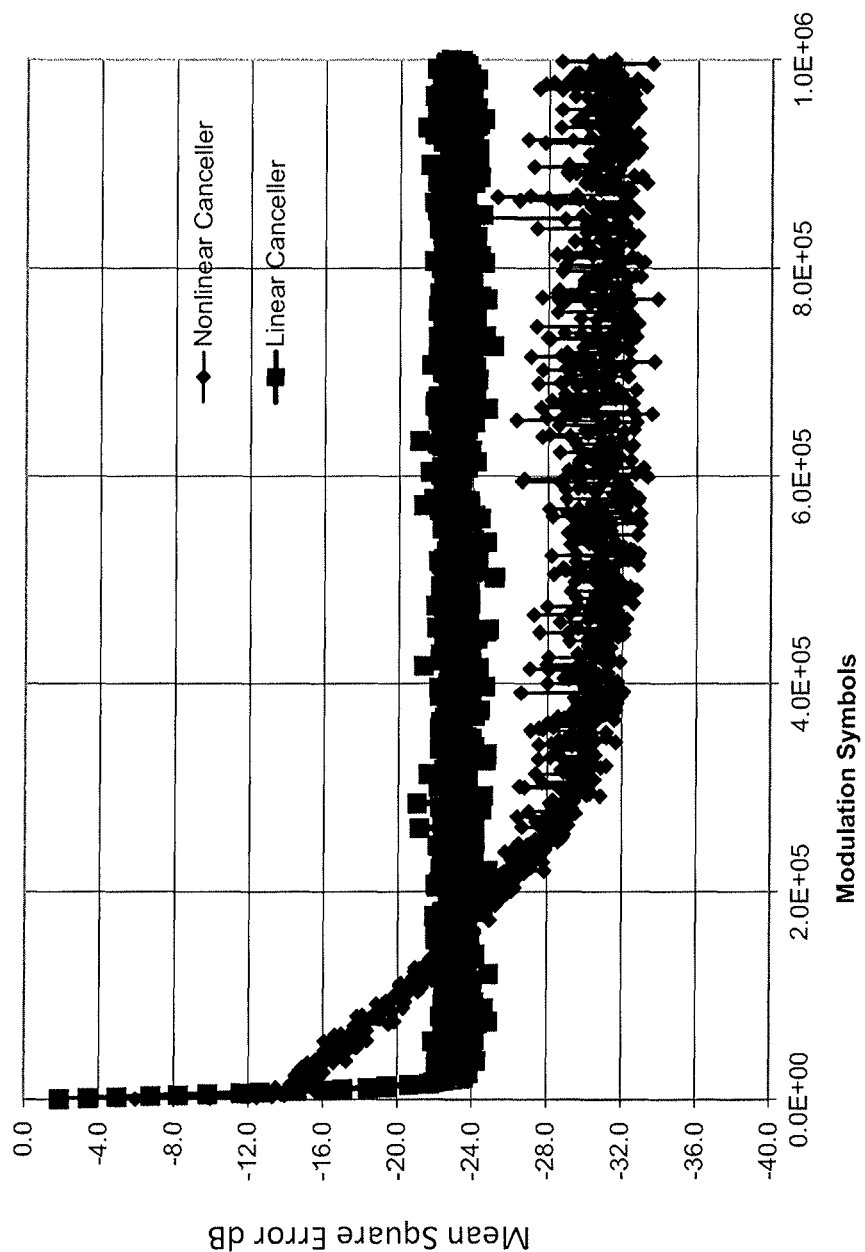
FIG. 6 is an exemplary mean-square error performance graph for channel reuse in the satellite system of FIG. 3.

The waveform filter was a conventional Square-Root-Raised-Cosine filter with a rolloff factor of 0.15. Tests were run with an input power backoff of 5 dB relative to the average transmit power as this value is consistent with spectrum requirements after the nonlinearity and a small output power backoff. FIG. 6 shows cancellation of an undesired interference signal with a conventional linear canceller to a level of about −23 dB and a level of about −31 dB with the present invention nonlinear canceller. Because of interaction of the nonlinear canceller coefficients, adaptation time is significantly longer for the nonlinear canceller. The tests were performed with a desired signal equal in power to the undesired signal. In the simulation the desired signal is digitally removed after cancellation so the cancellation levels can be observed. The same level of about 31 dB of cancellation for the nonlinear canceller is realized for smaller desired-signal powers relative to the interference power. In what was earlier calculated in the Background section to be a worst case scenario for a satellite-transponder system the desired signal, i.e., the received remote terminal signal, was 10 dB weaker that the interference signal, i.e., the received distorted-interference signal from the local terminal. In this analysis a cancellation objective for the invention was established for the residual-interference signal at −27 dB. The simulation results in FIG. 3 show that this objective is not achieved in a conventional linear cancellation system but is realized in the present invention.

Figure 7:
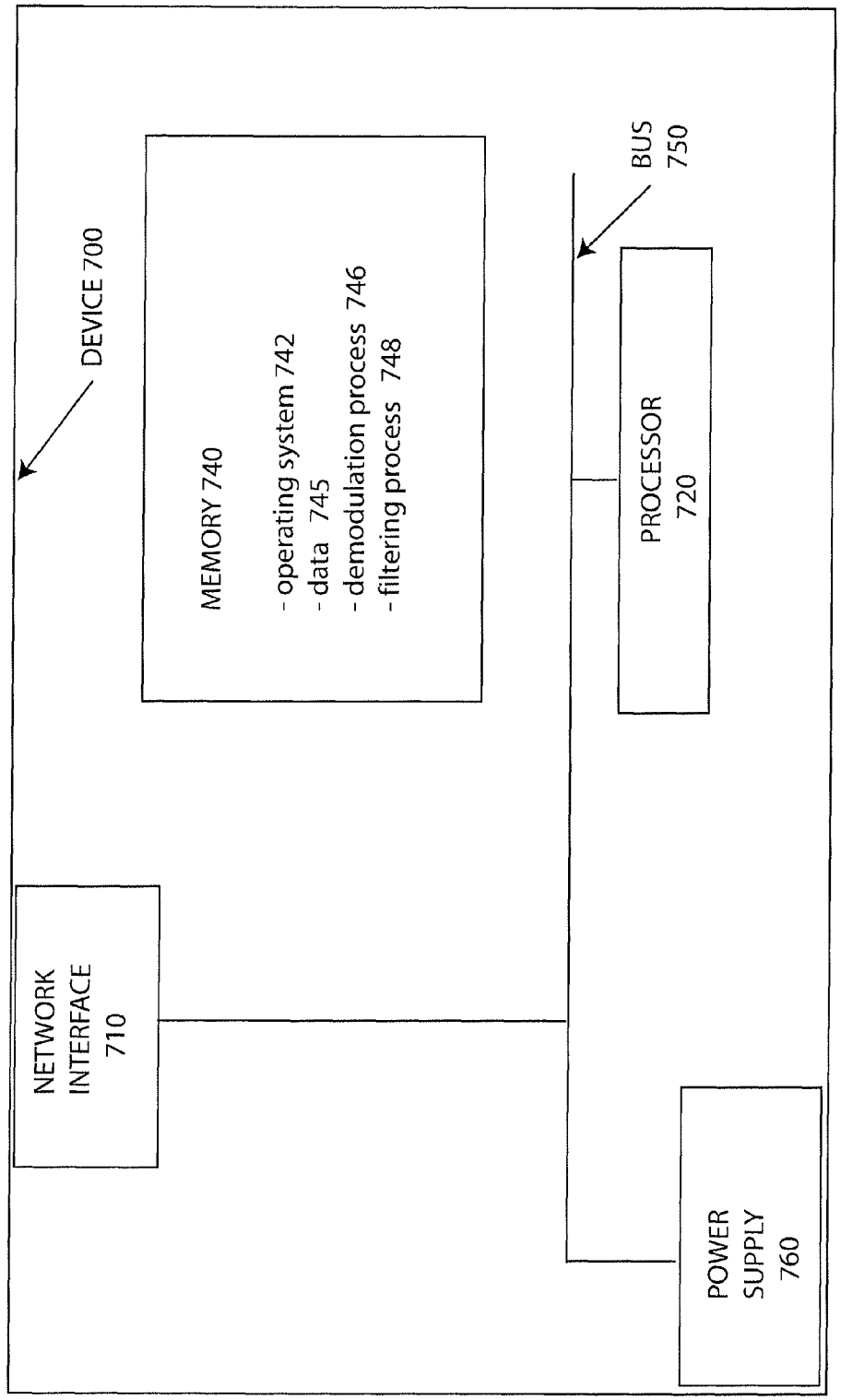
FIG. 7 is a block diagram of an exemplary receiver device.

FIG. 7 is a block diagram of an example device 700 that may be used with one or more embodiments described herein, e.g., as a communication system in which demodulation of a desired signal is accomplished in the presence of a nonlinear-distorted interference signal using a distortion-free version of the interference signal as shown in FIG. 1 above. The device 700 may comprise one or more network interfaces 710 (e.g., wired, wireless, etc.), at least one processor 720, and a memory 740 interconnected by a system bus 750, as well as a power supply 760. The network interface(s) 710 contain the signaling circuitry for communicating data to/from the device 700. The network interfaces may be configured to transmit and/or receive data using a variety of different communication protocols. The memory 740 comprises a plurality of storage locations that are addressable by the processor 720 and the network interfaces 710 for storing software programs and data associated with the embodiments described herein. The processor 720 may comprise hardware elements/logic adapted to execute the software programs and manipulate the data 745. An operating system 742, portions of which are typically resident in memory 740 and executed by the processor, functionally organizes the device by invoking operations in support of software processes and/or services executing on the device. These software processes and/or services may comprise demodulation process 744, filtering process 748, etc., as described above.

It will be apparent to those skilled in the art that other processor and memory types, including various computer-readable media, may be used to store and execute program instructions pertaining to the techniques described herein. Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion.

Although preferred and alternative embodiments of the invention have been described using specific terms, such description is for illustrative purposes only, and it is to be understood that changes and variations may be made without departing from the spirit or scope of the following claims.

What is claimed is:

1. A receiving apparatus for use in a satellite ground terminal that generates in a source-transmitter a digital-data source signal that is modulated to a modulated-source signal and subsequently, filtered and converted to a bandpass signal and distorted in a nonlinear power amplifier to produce a bandpass distorted-interference signal, the receiving apparatus comprising:
   a receiver filter/sampler with a receiver-timing clock for filtering, with a matched filter, a received signal containing a bandpass desired signal, which has a modulation period of $T_D$ seconds, is filtered with a waveform filter, and is derived from desired-signal digital-data and the delayed bandpass distorted-interference signal to produce a period-$T_R$, $T_R<T_D$, discrete-time receiver signal, wherein the matched filter has a complex conjugate, time-inverted impulse response of the waveform filter, wherein $T_D$ and $T_R$ are nonzero real numbers less than unity;
   a synchronizer/sampler for sampling at a rate of $1/T_R$ the modulated-source signal and comparing the sampled modulated-source signal with the period-$T_R$ discrete-time receiver signal to produce a transmission time delay that is applied to the sampled modulated-source signal to produce a synchronized-interference signal;
   a vector power series generator that produces a power vector with components that depend on the magnitude of the synchronized-interference signal;
   a source multiplier that multiplies the synchronized-interference signal and the power vector to produce an interference vector;
   a matched filter that filters the interference vector with the waveform filter to produce a matched-interference vector;
   a weight generator that produces a vector of distortion weights that depend on the matched-interference vector;
   a vector processor that produces from the vector of distortion weights a distorted-interference signal that depends on the interference vector;
   a combiner that sums the distorted-interference signal and the discrete-time receiver signal to produce a residual-interference signal; and
   a desired-signal demodulator for demodulating the residual-interference signal to produce estimates of the desired-signal digital-data.

2. The receiving apparatus of claim 1, wherein the vector processor multiplies the interference vector and the vector of the distortion weights to produce a dot product that is filtered and sampled with the matched filter to produce the distorted-interference signal.

3. The receiving apparatus of claim 2 wherein the interference filter is time-division multiplexed to perform one filtering operation in each multiplex step for each of the components of the interference vector.

4. The receiving apparatus of claim 1, wherein the power vector components produced by the power series generator include matched-interference signal magnitude values raised to the n−1 power, where n is an integer that is greater than unity.

5. The receiving apparatus of claim 1, wherein the weight generator includes an estimated-gradient algorithm updated with the product of the matched-interference vector and the residual-interference signal.

6. A method for producing a bandpass distorted-interference signal in a satellite-transponder communication system that includes, at a local terminal, a digital-data source signal that is modulated to a modulated-source signal and, subsequently, filtered and converted to a bandpass signal and distorted in a nonlinear power amplifier to produce a bandpass distorted-interference signal, the method comprising:
   filtering at the local terminal a received signal containing a bandpass desired signal;
   deriving by waveform filtering modulated desired-signal digital-data produced at a remote terminal and the delayed bandpass distorted-interference signal;
   producing a discrete-time receiver signal;
   sampling the modulated-source signal and comparing the sampled modulated-source signal with the discrete-time receiver signal to produce a transmission time delay that is applied to the sampled modulated-source signal to produce a synchronized-interference signal;
   power generating a power vector with components that depend on the magnitude of the synchronized-interference signal;
   multiplying the synchronized-interference signal and the power vector to produce an interference vector;
   interference filtering the interference vector to produce a filtered-interference vector;
   weight generating a vector of distortion weights that depend on the filter-interference vector;
   vector processing with the vector of distortion weights to produce a distorted-interference signal that depends on the interference vector;
   combining the distorted-interference signal and the discrete-time receiver signal to produce a residual-interference signal; and
   demodulating the residual-interference signal to produce estimates of the remote-terminal desired-signal digital-data.

7. The method of claim 6, wherein the vector processing step multiplies the interference vector and the vector of the distortion weights to produce a dot product.

8. The method of claim 7, further comprising a step of filtering the dot product to produce the period-$T_S$ distorted-interference signal.

9. The method of claim 8, where the received signal filtering, interference filtering, and dot product filtering steps perform the same filtering that corresponds to the complex conjugate, time-inverted impulse response of the waveform filtering at the remote terminal.

10. The method of claim 6, wherein the power vector components produced in the power generating step includes filtered-interference signal magnitude values raised to the n-1 power, where n, integer, is greater than unity.

11. The method of claim 6, wherein the weight generating step includes an estimated-gradient algorithm that is updated with the product of the filtered-interference vector and the residual-interference signal.

12. A transceiver for generation of a bandpass-interference signal, non-linear distortion interference cancellation, and demodulation of a cancelled signal, the transceiver comprising:

a source modulator that produces the bandpass-interference signal from a modulated-source signal;

a receiver filter/sampler, with a receiver-timing clock having a matched filter for filtering a received signal containing a bandpass distorted-interference signal, which results from passing the bandpass-interference through a nonlinear amplifier, and containing a bandpass desired signal, which is derived from desired-signal digital-data, and which has a modulation period of $T_D$ seconds and is filtered with a waveform filter, which produces a period-$T_R$, $T_R<T_D$, discrete-time receiver signal, wherein the matched filter has a complex conjugate, time-inverted impulse response of the waveform filter, wherein $T_D$ and $T_R$ are nonzero real numbers less than unity;

a synchronizer/sampler that samples at a rate of $1/T_R$ the modulated-source signal and compares the modulated-source signal with the period-$T_R$ discrete-time receiver signal to produce a transmission time delay applied to the modulated-source signal thereby producing a synchronized-interference signal;

a vector power series generator that produces a power vector having components dependent on the magnitude of the synchronized-interference signal;

a source multiplier that multiplies the synchronized-interference signal and the power vector to produce an interference vector;

a matched filter that filters the interference vector with the waveform filter to produce a matched-interference vector;

a weight generator that produces a vector of distortion weights dependent on the matched-interference vector;

a vector processor that produces from the vector of distortion weights a distorted-interference signal depending on the interference vector;

a combiner that sums the distorted-interference signal and the discrete-time receiver signal to produce a residual-interference signal; and a desired-signal demodulator for demodulating the residual-interference signal to produce estimates of the desired-signal digital-data.

* * * * *